United States Patent Office 3,292,359
Patented Dec. 20, 1966

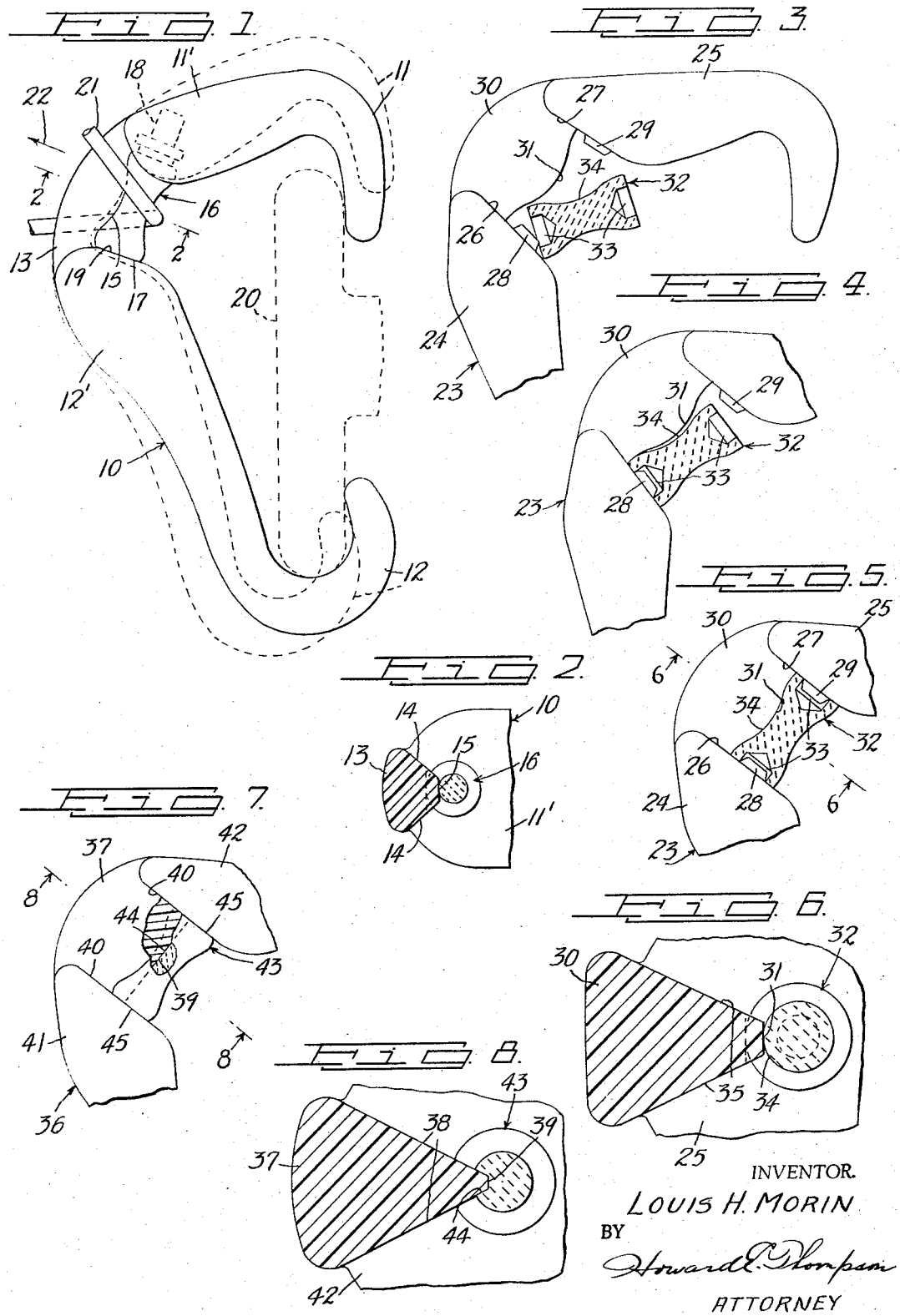

1

3,292,359
TRAVELER HAVING A WEAR
RESISTANT ELEMENT
Louis H. Morin, Bronx, N.Y., assignor to Coats & Clark
Inc., New York, N.Y., a corporation of Delaware
Filed Aug. 19, 1963, Ser. No. 302,900
6 Claims. (Cl. 57—125)

This invention relates to travelers molded from plastic material, such as nylon and the like, wherein a molded brittle wear resistant element is employed in connection with the traveler either coupled as an insert with the traveler or otherwise coupled therewith to be retained against accidental displacement from the traveler. More particularly, the invention deals in a traveler structure of the character defined, wherein the hook ends or horns of the traveler can be flexed or spread in mounting the same upon a traveler ring without setting up any stress or strain on the brittle wear resistant element employed.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged diagrammatic side view of one form of traveler and wear resistant element, illustrating arrangement of the traveler upon a traveler ring outlined in dotted lines and also illustrating in dotted lines the spread of the traveler horns or hook ends.

FIG. 2 is a section on the line 2—2 of FIG. 1 omitting the thread.

FIGS. 3, 4 and 5 are views generally similar to FIG. 1 showing only part of the construction and diagramatically illustrating the attachment of the wear resistant element employed.

FIG. 6 is an enlarged section on the line 6—6 of FIG. 5.

FIG. 7 is a view generally similar to FIG. 5 showing another form of construction, with part of the construction broken away and in section; and FIG. 8 is an enlarged section on the line 8—8 of FIG. 7.

In travelers of the type and kind under consideration employing wear resistant inserts in a molded plastic traveler body, stresses or strains to which the traveler horns or hook ends are subjected in mounting the same upon a traveler ring would result in destruction to the wear resistant element employed, particularly when such element is formed of brittle ceramic material and it is the object of the present invention to provide a method of producing travelers employing ceramic elements, wherein the stresses or strains referred to are not transmitted to the wear resistant element. In other words, the horns or hook ends of the traveler are free to flex without destruction to the ceramic element employed.

In FIGS. 1 and 2 of the drawing, I have shown one adaptation of my invention and method of producing a traveler and, in FIG. 1, 10 represents the traveler body, having hook-shaped ends or horns 11 and 12 with short and long arms 11', 12' united in a reduced neck portion 13, having inwardly contracted side walls 14, as clearly noted in FIG. 2 of the drawing. The neck terminates at its inner end in a surface 15, generally of the contour shown in FIG. 1 or, in other words, conforming with the contour of the more or less hourglass-shaped wear resistant element 16, which is molded from any suitable ceramic material, such as Alsimag. The element 16 has a flat surface 17 at one end; whereas, the other end includes an anchoring extension 18, generally of the contour outlined in dotted lines in FIG. 1. It will, thus, be apparent that the element 16 is in the form of an insert used in the molding of the traveler 10 from suitable plastic material, such as nylon, and in this operation, the end surface 17 of the element is free to move relatively to the adjacent surface 19 at the end of the arm 12' when the traveler is in use and, particularly, in flexing the ends 11 and 12 one with respect to the other, as indicated diagrammatically in dotted lines in FIG. 1 in application of the traveler to a traveler ring 20, diagrammatically outlined in dotted lines in FIG. 1. The characteristics of the material employed in the traveler will permit the flexing operation, diagrammatically illustrated.

In FIG. 1 of the drawing, I have indicated, in part, at 21 a thread passing over the element 16 in the use of the traveler. Normally, the spring action of the arms 11', 12' serves to maintain the surfaces 17 and 19 in abutting engagement with each other, as well as to maintain the element 16 in engagement with the surface 15 of the neck. Further, in the use of the traveler, the thread, as well as centrifugal force, urges the element 16 in constant engagement with the surface 15. This force is indicated by the arrow 22 in FIG. 1 of the drawing. In the flexing of the traveler ends 11 and 12, it will be apparent from the dotted line showing in FIG. 1 that the surface 19, as well as the surface 15, move away from adjacent surfaces of the element 16, forming what might be termed a gap. Upon release the ends 11 and 12, the traveler will snap back into its normal position.

Turning now to the illustrations in FIGS. 3 to 6, inclusive, in these figures 23 represents a traveler, generally of the contour of the traveler 10 shown in FIG. 1, modified to the extent that adjacent end portions of the arms 24 and 25, or the normal parallel surfaces 26 and 27, have projecting tapered key members 28 and 29; whereas, the reduced neck 30 of the traveler has an inner surface 31, which generally conforms to the contour of the ceramic wear resistant element 32. The molded element 32 has, at its ends, sockets 33 to fit snugly over the base of the key members 28 and 29 in retaining the element 32 against accidental displacement.

With the structure shown in FIGS. 3 to 6, inclusive, it will be apparent that the traveler 23 and element 32 are independently molded and the element 32 becomes detachably coupled with the traveler, as and when it is desired to renew or replace the wear resistant element.

In FIGS. 3 to 5, inclusive, I have diagrammatically illustrated the steps of assembling the element 32 by simply flexing the end portions of the traveler in the manner illustrated, in part, in FIG. 1 of the drawing and, in this operation, one end of the element 32 is first coupled with one of the members, for example, the member 28, to bring the parts from the position of FIG. 3 to the position of FIG. 4; whereupon, the flexure is released and then the member 29 will enter the free socket 30, producing the resulting assemblage, as illustrated in FIG. 5 of the drawing. With the parts in this position, it will be understood that the traveler can still be flexed in the manner illustrated in FIG. 1 for assembling the same with a traveler ring without displacement of the element 32 and, in use, the element 32 will at all times be retained in position with the surface 34 of the element 32 in engagement with the surface 31 of the neck 30, clearly illustrated in FIG. 5 of the drawing. Considering FIG. 6 of the drawing, it will be apparent that the neck 30 has contracted sides 35 extending to the inner surface 31.

In replacing an element 32, the operations illustrated in FIGS. 3 to 5 inclusive will be reversed, in other words, one end of the element will be first detached from the member 29 and then removed from the member 28.

Now turning to the showing in FIGS. 7 and 8 of the drawing, in these figures I have indicated in part at 36 a traveler, generally similar to the traveler 10, in other words, where the neck portion 37 has contracted sides 38 terminating at its inner end in a transversely straight surface 39 extending between the spaced parallel surfaces 40 at adjacent ends of the arms 41, 42 of the traveler. With this construction, the wear resistant ceramic element 43 is generally of the shape of the element 16 and, in molding the element 43, a groove 44 is formed longitudinally thereof, conforming to the contour of the contracted side surfaces 38 and the inner end 39 of the neck 37, as clearly illustrated in FIG. 8 of the drawing. With this construction, a suitable cement is applied to the surface 39 to adhere the element 43 to said surface. However, the end surfaces 45 of the element 43 will be free or unattached to the surfaces 40, so that, in the flexure of the traveler, as diagrammatically illustrated in FIG. 1, the surfaces 40 are free to move away from the end surfaces 45 of the element 43 in the operation of mounting the traveler on the traveler ring and the element 43 will be definitely retained in position on the neck 37.

In forming the element 43, the length thereof will be such as to provide a normal pressure engagement of the surfaces 40 with the end surfaces 45 of the element.

With the several forms of construction shown, wear resistant elements can be molded of a single size and utilized in conjunction with different size travelers, so long as the neck portion of the traveler and the adjacent end portions of the arms are formed of the same size, spacings and contour, which would result in an extensive saving in the production of devices of the kind under consideration. Furthermore, the detachable characteristics of the element facilitate re-use of the elements in conjunction with other traveler bodies which may have become worn by virtue of engagement with the traveler ring at the several points of contact of the hook ends or horns 11 and 12 with the traveler ring, as will be apparent from a consideration of FIG. 1 of the drawing.

Having fully described my invention, what I claim as new and desire to secure by Letters Patent is:

1. A traveler of the character defined comprising a molded plastic body having relatively flexing hook end portions joined in a neck, a molded ceramic wear resistant element having predetermined longitudinal peripheral contour, the neck of the traveler having a contoured surface conforming with the longitudinal peripheral contour of said element, at least a portion of the element being displaceable with respect to the traveler, and said traveler and element having interengaging means retaining the element against displacement in flexing of the hook end portions of the traveler when mounting the traveler upon a traveler ring.

2. A traveler as defined in claim 1, wherein said last named means comprises an anchorage portion on one end only of said element, upon which an adjacent part of one end portion of the traveler is molded.

3. A traveler as defined in claim 1, wherein the last named means comprises sockets at the end portion of said element and key members on adjacent spaced surfaces of the end portions of the traveler engaging said sockets at said end portions of said element.

4. A traveler as defined in claim 1, wherein the last named means comprises a longitudinal groove in said element, and said neck having a portion fitting snugly in said groove.

5. A traveler as defined in claim 4, wherein said portion of the neck is adhesively secured in said groove.

6. A traveler as defined in claim 1, wherein said neck is contracted in the direction of said contoured surface.

References Cited by the Examiner
UNITED STATES PATENTS

| | | | |
|---|---|---|---|
| 2,942,407 | 6/1960 | Morin | 57—125 |
| 2,961,826 | 11/1960 | Morin | 57—125 |
| 2,966,026 | 12/1960 | Morin | 57—125 |
| 3,055,166 | 9/1962 | Morin | 57—125 |

FRANK J. COHEN, *Primary Examiner.*

J. PETRAKES, *Assistant Examiner.*